May 14, 1963

W. O. LUM 3,089,510

REMOVABLE VALVE HEAD AND SEAT UNIT

Filed Dec. 8, 1959

INVENTOR.
WALTER O. LUM

BY *Hane + Nydick*

ATTORNEYS

United States Patent Office 3,089,510
Patented May 14, 1963

3,089,510
REMOVABLE VALVE HEAD AND SEAT UNIT
Walter O. Lum, Livingston, N.J.
(1013 NE. Harriet St., Port Charlotte, Fla.)
Filed Dec. 8, 1959, Ser. No. 858,267
3 Claims. (Cl. 137—454.6)

This invention relates to valves and, more particularly, to improvements in valves of the general type disclosed in U.S. Patent No. 2,868,223, dated January 15, 1959.

It is an object of the present invention to provide an improved valve mechanism of the type generally described in the aforementioned U.S. patent, which can be readily used in all types of conduits and fluid distribution systems, thus substantially reducing the number of parts and reducing the cost of manufacture.

Still another object of the present invention is to provide a pressure responsive valve mechanism which will effectively control the flow of fluid between parts of a fluid distribution line without leakage, loss of pressure, or the like.

Still an additional object of the present invention is to provide a fluid distribution valve assembly which requires a minimum amount of maintenance, repairs, and replacement parts, and which can be used for prolonged periods of time without difficulty.

A more specific object of the present invention is to provide a valve assembly of the type described having a minimum number of parts, which can be manufactured in large quantities at a relatively low cost, and which can be readily disassembled for repair purposes.

All of the foregoing and still further objects and advantages of the invention will become apparent from a study of the following specification, taken in connection with the accompanying drawing, wherein.

Figure 3:
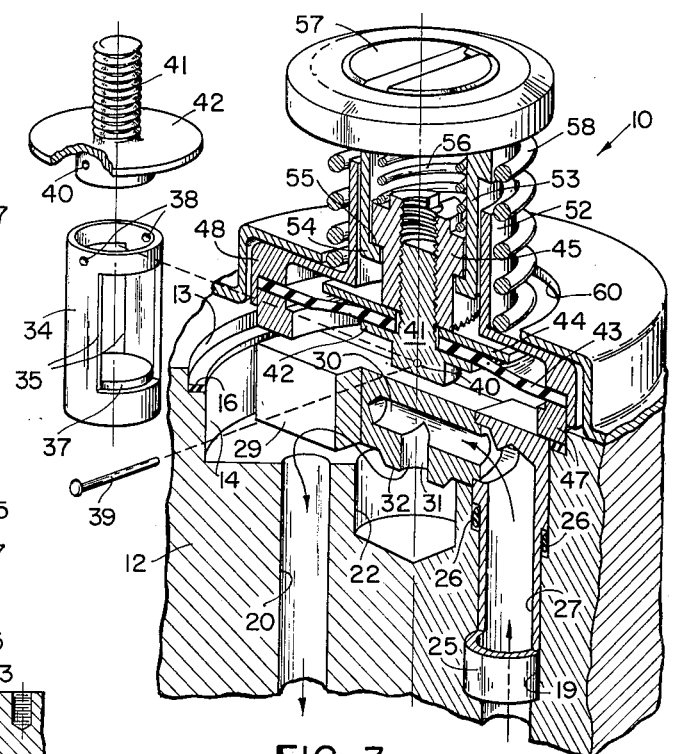
FIGURE 3 is an enlarged partially expoded fragmentary perspective view, with parts broken away, of the general assembly of the present invention.

Referring now to the drawing, and more particularly to FIGURE 3 thereof, the valve assembly 10 made in accordance with the present invention is shown in operative association with member 12, which member may be an element of a fluid dispenser such as the dispensing head 142 of U.S. Patent 2,868,223. Said member may include a portion having an opening 13 and counterbore 14 defining a cavity 18 within which the fluid control apparatus may be installed. A shoulder 15 is formed between the opening 13 and counterbore 14, upon which an annular gasket 16 is seated. A pair of spaced apart parallel bores 19, 20 extend through the member 12, the larger bore 19 defining a supply duct and the smaller bore 20 defining a delivery duct. A sump 22 intermediate both bores 19, 20 cooperates with a duct piece 24, in a manner hereinafter more fully described.

Figure 1:
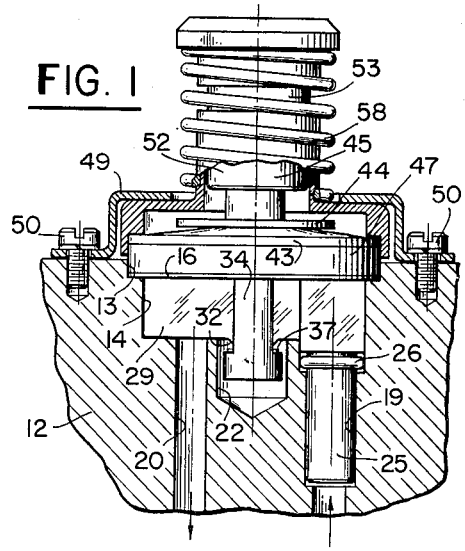
FIGURE 1 is a fragmentary side elevational view of a valve assembly made in accordance with the present invention, with parts broken away.
Figure 2:
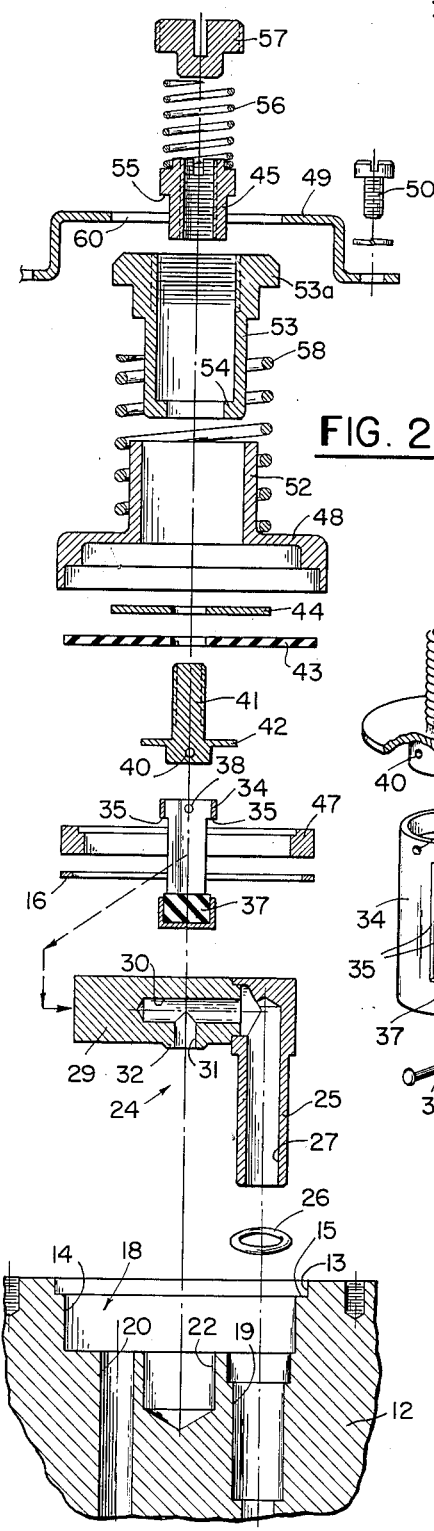
FIGURE 2 is an enlarged fragmentary longitudinal cross sectional exploded view of various components of the present invention.

Referring now more specifically to FIGURE 2 of the drawing, the duct piece 24 is shown to be of generally L-shaped configuration having a first leg 25 which may be inserted together with an O-ring gasket 26 into the enlarged supply duct bore 19 of the member 12. This leg 25 includes a longitudinal bore 27 that defines an inlet into the interior of the duct piece 24, whereas the other leg 29 defines a longitudinal bore 30 with which an outlet 31 communicates, which outlet extends substantially normal to the longitudinal axis of the bore 30 and parallel to the longitudinal axis of the inlet bore 27. The portions of the duct piece 24 surrounding the outlet 31 define a seat 32 which is of generally smaller and shorter size than the size of the sump 22 into which it empties.

A tubular valve member 34 having a pair of slots 35 at diametrically opposite sides is mounted upon the horizontal leg 29 of the duct piece 24 for reciprocating longitudinal movement in a direction normal to the supporting leg 29. One lower end of the tubular valve member 34 includes a valve closure member 37 which is movable into closing engagement with the seat 32 of the outlet 31. The opposite end of the tubular valve member 34 is provided with a pair of diametrically opposite holes 38 which are aligned with a transversely extending bore 40 in a connector 41, through which a connecting pin 39 extends.

The connector 41 is provided with a radially outwardly extending flange 42 upon which a flexible diaphragm 43 is supported. The opposite side of the diaphragm 43 is partially covered by a rigid washer 44 which together with the flange 42 clamps the diaphragm in pressure resistant relationship with the connector 41 when an internally threaded sleeve 45 is threadedly engaged upon the connector 41 and forces the washer 44 into such clamping engagement with the flange 42.

The outer periphery of the diaphragm 43 is clamped between a mounting ring 47 which is received within the opening 13 of the conduit 12 and seated upon the gasket 16, and a cover plate 48 which serves as a bezel and is clamped in securing engagement with the diaphragm 43 by a mounting plate 49 by means of bolts 50. Thus, the mounting plate 49 is securely mounted upon the conduit 12 to clamp the bezel type cover plate 48 in clamping engagement with the diaphragm 43 which prevents communication between the interior of the valve parts and the atmosphere.

The cover plate 48 also includes an outwardly extending center post 52 within which a plunger 53 is slidably supported for reciprocating longitudinal movement in a direction normal to the plane of the diaphragm and substantially coaxially with the outlet 31 in the duct piece. The innermost end of the plunger 53 is provided with a radially inwardly extending lip 54 which is engageable with a shoulder 55 defined by the sleeve 45, to thus support the sleeve 45 and connected valve member 34 and closure pad 37 in closing engagement with the outlet 31 of the duct piece. A compression coil spring 56 is secured in abutment at one end with a cap screw 57 carried by the plunger 53 and at the opposite end in abutment with the sleeve 45. A larger compression coil spring 58 encircling the center post 52 and the exterior of the plunger 53 acts against the cover plate 48 and the head 53a of the plunger 53 so as to yieldably resist downward movement of the plunger and normally maintain the valve closure pad 37 in closing engagement with the outlet seat 32. It will be noted that there is an opening 60 in the mounting plate 49 which is sufficiently large to accommodate the lower end of the larger compression coil spring 58.

It will now be recognized that the valve assembly parts may be assembled within any conduit having a supply and delivery duct and central sump portion in the arrangement shown in the drawing. Once installed, the valve assembly effectively controls the flow of fluid between such supply and delivery lines. The compression coil spring 58 normally maintains the closure pad 37 in closing engagement with the outlet 31 of the duct piece, so that flow through the duct piece 24 is effectively blocked. However, in response to downward pressure upon the plunger 53, against the action of the coil spring 58, the closure pad 37 is lowered by the tubular valve member 34 into the sump 22, away from the seat 32, to allow fluid flow through the outlet 31, into the enlarged sump 22 and thence outwardly through the delivery duct 20 of the conduit 12. In the event of an excessive downward pressure upon the plunger 53, the smaller compression coil spring 56 serves as lost motion means to allow the plunger 53 to continue downwardly without further depressing the tubular valve member 34. Furthermore, the pressure of the downstream flow is regulated by appropriate adjustment of the pressure on the diaphragm 43 through the setting of cap screw 57 threadingly engaged in the head 53a of the plunger 53.

It will be recognized that the instant valve structure is maintained in actuating assembled relationship by the positive abutment of the duct piece 24 against the ring 47.

It will also be recognized that the valve construction of the present invention is positively acting, includes a minimum number of parts, and is completely sealed against contamination from exterior parts of the system by the flexible diaphragm 43. On the other hand, the parts are readily removed and disassembled for maintenance and repair purposes whenever required.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. In combination: a fluid supply member having an internal shoulder and a pair of spaced apart parallel bores, a valve assembly releasably seated on the shoulder, the assembly comprising: a duct piece resting on the shoulder, an inlet communicating with one of said parallel bores and an outlet, a valve closure guidably associated with said duct piece for movement between an open and a closed position relative to said fluid outlet of said duct piece, and manually operable spring means yieldably urging said valve closure toward said closed position; said duct piece comprising a substantially rigid L-shaped member having a pair of perpendicularly related legs with an internal bore extending at least partially through each said leg, one end of the bore in one leg defining said fluid inlet, and a seat integral with the other one of said legs defining said fluid outlet; and wherein said fluid supply member includes a sump intermediate said parallel bores of substantially larger diameter and greater depth than said seat, and said seat being received within said sump, the space between said seat and said sump providing communication between the other one of said parallel bores and said outlet.

2. A valve assembly comprising; in combination, a duct piece having a fluid inlet and a fluid outlet, said duct piece comprising an L-shaped member having a pair of perpendicularly related legs with an internal bore extending at least partially through each said leg, one end of the bore of one leg defining said fluid inlet, and a seat integral with the other one end of said legs defining said fluid outlet, a valve closure guidably associated with said duct piece for movement between an open and a closed position relative to said fluid outlet, a manually operable spring yieldably urging said valve closure toward said closed position, a support for said spring, said support including an annular element, and a ring disposed between and in direct contact with the annular element and the ends of said leg having said fluid outlet, whereby the valve assembly is maintained in actuating assembled relationship by the positive abutment of the duct piece against said ring.

3. A valve assembly as set forth in claim 2 wherein said support comprises a cover plate having a peripheral portion constituting said annular element.

References Cited in the file of this patent
UNITED STATES PATENTS

| | | |
|---|---|---|
| 1,793,292 | Taylor | Feb. 17, 1931 |
| 2,868,223 | Lum | Jan. 13, 1959 |
| 3,003,519 | Homeyer | Oct. 10, 1961 |